(12) United States Patent
Vasileiadis et al.

(10) Patent No.: US 12,165,092 B2
(45) Date of Patent: Dec. 10, 2024

(54) WORKFLOW TRANSFORMATION FRAMEWORK

(71) Applicant: International Business Machines Corporation, Armonk, NY (US)

(72) Inventors: Vasileios Vasileiadis, Dublin (IE); Marco Simioni, Dublin (IE); Stefano Braghin, Dublin (IE); Michael Johnston, Dublin (IE); Yiannis Gkoufas, East Wall (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/656,917

(22) Filed: Mar. 29, 2022

(65) Prior Publication Data
US 2023/0316188 A1    Oct. 5, 2023

(51) Int. Cl.
*G06Q 10/0633* (2023.01)
*G06Q 10/0635* (2023.01)

(52) U.S. Cl.
CPC ..... *G06Q 10/0633* (2013.01); *G06Q 10/0635* (2013.01)

(58) Field of Classification Search
CPC .................................................. G06Q 10/0633
See application file for complete search history.

(56) References Cited

U.S. PATENT DOCUMENTS

| | | | |
|---|---|---|---|
| 7,219,341 B2 | 5/2007 | Dalton | |
| 7,653,562 B2 | 1/2010 | Schulz | |
| 9,225,734 B1 | 12/2015 | Hastings | |
| 9,405,787 B2 | 8/2016 | Takenouchi | |
| 11,030,340 B2 | 6/2021 | Antonatos | |

(Continued)

FOREIGN PATENT DOCUMENTS

| | | |
|---|---|---|
| CN | 107391611 A | 11/2017 |
| EP | 2397977 A1 | 12/2011 |

(Continued)

OTHER PUBLICATIONS

Bukhari et al., "Scientific Workflow Makespan Minimization In Edge Multiple Service Providers Environment", Research Square, Apr. 2021, 23 Pages.

(Continued)

*Primary Examiner* — Andre D Boyce
(74) *Attorney, Agent, or Firm* — Randy Tejeda

(57) ABSTRACT

In an approach for transforming workflows based on goals and constraints, a processor receives a workflow definition and one or more events for a workflow output by a workflow orchestrator, wherein the one or more events are at least one of a parsing event and a scheduling event. A processor determines, using one or more transformers, one or more transformations to the workflow based on a set of goals and constraints, wherein the one or more transformations is at least one of addition of a new node, addition of a new graph, modification of at least one existing node, modification of at least one existing graph, removal of at least one existing node, and removal of at least one existing graph. A processor dynamically applies, using one or more enforcers, the one or more transformations to the workflow based on the set of goals and constraints.

20 Claims, 8 Drawing Sheets

(56) References Cited

U.S. PATENT DOCUMENTS

| | | | |
|---|---|---|---|
| 2003/0208743 A1* | 11/2003 | Chong | G06F 8/30 |
| | | | 717/106 |
| 2004/0103014 A1 | 5/2004 | Teegan | |
| 2005/0234761 A1* | 10/2005 | Pinto | G06Q 10/0635 |
| | | | 705/7.31 |
| 2005/0234763 A1* | 10/2005 | Pinto | G06Q 10/04 |
| | | | 706/21 |
| 2007/0055558 A1* | 3/2007 | Shanahan | G06Q 10/06 |
| | | | 705/7.26 |
| 2007/0083588 A1* | 4/2007 | Keller | G06Q 10/06 |
| | | | 709/202 |
| 2009/0089078 A1* | 4/2009 | Bursey | G06Q 30/0281 |
| | | | 382/293 |
| 2009/0307172 A1 | 12/2009 | Mcmurtry | |
| 2010/0070422 A1 | 3/2010 | Kikuchi | |
| 2011/0225565 A1* | 9/2011 | van Velzen | G06Q 10/067 |
| | | | 705/348 |
| 2011/0267351 A1* | 11/2011 | Curbera | G06T 11/206 |
| | | | 345/440 |
| 2014/0074764 A1* | 3/2014 | Duftler | G06N 7/01 |
| | | | 706/47 |
| 2014/0130178 A1 | 5/2014 | Agrawal | |
| 2016/0188594 A1* | 6/2016 | Ranganathan | G06F 9/5066 |
| | | | 707/769 |
| 2018/0004835 A1 | 1/2018 | Piechowicz | |
| 2018/0365614 A1 | 12/2018 | Palmer | |
| 2020/0241928 A1* | 7/2020 | Senevirathne | G06F 17/16 |
| 2020/0327252 A1 | 10/2020 | Mcfall | |
| 2021/0208953 A1 | 7/2021 | Vasileiadis | |
| 2021/0224122 A1* | 7/2021 | Glass | G06F 9/3836 |
| 2022/0043826 A1 | 2/2022 | Zorin | |
| 2023/0119331 A1* | 4/2023 | Glass | H04L 41/5054 |
| | | | 718/104 |

FOREIGN PATENT DOCUMENTS

| | | |
|---|---|---|
| WO | 2013044142 A2 | 3/2013 |
| WO | 2016090010 A1 | 6/2016 |

OTHER PUBLICATIONS

Gkoufas et al., "Transparent Data Transformation and Access for Workloads in Cloud Environments", US IBM Patent Application No. U.S. Appl. No. 17/138,858, Filed: Dec. 30, 2020, Docket No. P202003253US01, 34 p.

Shizuka et al., "Workflow Transformation for Real-Time Big Data Processing", 2016 IEEE International Congress on Big Data, San Francisco, CA, USA, Jun. 27-Jul. 2, 2016, 4 Pages.

Johnston et al., "Workflow Patching", US IBM U.S. Appl. No. 16/949,741, Filed: Nov. 12, 2020, 59 Pages.

Konjaang et al., "Multi-objective workflow optimization strategy (MOWOS) for cloud computing", Journal of Cloud Computing: Advances, Systems and Applications, vol. 10, Article No. 11, Jan. 28, 2021, 19 Pages.

Vasileiadis et al., "Workflow Memoization", US IBM U.S. Appl. No. 17/199,608, Filed: Mar. 12, 2021, 61 Pages.

Mell et al., "The NIST Definition of Cloud Computing", Recommendations of the National Institute of Standards and Technology, NIST Special Publication 800-145, Sep. 2011, 7 pages.

International Search Report and Written Opinion for Application PCT/EP2023/056411 dated Jun. 12, 2023, 13 pages.

* cited by examiner

WORKFLOW TRANSFORMATION FRAMEWORK

BACKGROUND OF THE INVENTION

The present invention relates generally to the field of workflow orchestration, and more particularly to a system for the transformation of workflows to meet a set of goals while complying with a set of constraints.

Orchestration involves configuring, managing, and coordinating computer applications and services automatically. Orchestration is different from automation. Automation is automating a single task to make our business more efficient and productive, but the orchestration automates the whole process and workflow, which may contain different disparate systems.

Workflow orchestration is the automation of a workflow or multiple tasks. In other words, orchestration handles multiple automated tasks to execute a single significant process or workflow. A workflow is a graph that contains nodes, which execute tasks (e.g. programs), and edges, that indicate dependencies between tasks.

Some benefits of workflow orchestration include automation, which helps increase efficiency, productivity, and accuracy while reducing the time to perform tasks, thus reducing operational expenses. One challenge for workflow orchestration is dynamically modifying a workflow to satisfy certain goals and constraints. It is an even bigger challenge to modify an under-execution workflow, commonly referred to as a workflow instance. A workflow instance comprises a workflow definition and information about the state of the workflow instance including the inputs to the workflow, the metadata of the inputs, the outputs of the workflow, the metadata of the outputs, and the metadata regarding the execution state of each workflow node.

SUMMARY

Aspects of an embodiment of the present invention disclose a method, computer program product, and computer system for the transformation of workflows to meet a set of goals while complying with a set of constraints. A processor receives a workflow definition and one or more events for a workflow output by a workflow orchestrator, wherein the one or more events are at least one of a parsing event and a scheduling event. A processor determines, using one or more transformers, one or more transformations to the workflow based on a set of goals and a set of constraints, wherein the one or more transformations is at least one of addition of a new node, addition of a new graph, modification of at least one existing node, modification of at least one existing graph, removal of at least one existing node, and removal of at least one existing graph. A processor dynamically applies, using one or more enforcers, the one or more transformations to the workflow based on the set of goals and the set of constraints.

In some aspects of an embodiment of the present invention, each transformer of the one or more transformers advertises one or more types of events that each respective transformer is set up to process.

In some aspects of an embodiment of the present invention, a processor triggers at least one transformer of the one or more transformers based on the one or more events received to process the one or more events and determine if there is a transformation to propose. A processor triggers at least one enforcer of the one or more enforcers based on the one or more transformations and the set of goals and the set of constraints.

In some aspects of an embodiment of the present invention, each enforcer of the one or more enforcers is set up to apply respective transformations based on at least one of a subset of the set of goals and a subset of the constraints.

In some aspects of an embodiment of the present invention, a processor receives, at a respective transformer, the workflow definition, a workflow instance state, workflow node data, a system state, the set of goals, and the set of constraints. A processor analyzes, at the respective transformer, the workflow at one or more granularities, the workflow node data, and the system state.

In some aspects of an embodiment of the present invention, a processor generates the one or more transformations by packaging the one or more transformations and exporting the one or more transformations in a format that the one or more enforcers can read. A processor tags the one or more transformations with metadata comprising benefits and risks for each transformation.

In some aspects of an embodiment of the present invention, a processor builds a workflow update strategy by applying at least one of a reasoning algorithm and an optimization algorithm to the one or more transformations subject to the set of goals and the set of constraints. A processor dynamically applies the workflow update strategy to the workflow to produce an updated workflow.

DETAILED DESCRIPTION

Embodiments of the present invention recognize that data and computationally intensive workflows are constantly executed in cloud infrastructures. Embodiments of the present invention provide a system and method for the transformation of workflows to meet a set of goals while complying with a set of constraints. Transformations can take place before, during, and after execution of a workflow instance. Embodiments of the present invention provide a system and method that work alongside a workflow orchestrator to pre-process and adapt on-the-fly (i.e., in process) existing workflows in order to meet specific goals, such as performance or cost optimization, compliance with data privacy policies and frameworks, reuse cached results of computation nodes to improve performance of subsequent or related calculations, and implement data-provenance mechanisms.

Embodiments of the present invention provide a system comprising a workflow orchestrator for loading and/or executing a workflow instance and emitting parsing and/or scheduling events; a supervisor component for observing the events output by the workflow orchestrator and triggering one or more transformer components as necessary; a transformer component with a set of transformers for suggesting transformations to the workflow in order to meet a set of goals and constraints; and enforcer component with a set of enforcers for applying suggested transformations to the workflow and including, in a reasoning, the set of required goals and constraints and expected benefits and/or risks of the transformations.

Advantages of embodiments of the present invention include: (1) guaranteeing that a workflow will be transformed to comply with a set of defined constraints and goals and (2) transparently updating workflows with no adaptation effort required from workflow developers or users.

As used herein, high-performance computing (HPC) is the use of parallel processing for running advanced application programs efficiently, reliably, and quickly. As used herein, a workflow is a sequence of tasks to be executed in order to carry out some computation, typically on HPC resources. Such tasks can either include jobs running on HPC resources or auxiliary tasks that may run outside the HPC resources.

Implementation of embodiments of the invention may take a variety of forms, and exemplary implementation details are discussed subsequently with reference to the Figures.

Figure 1:
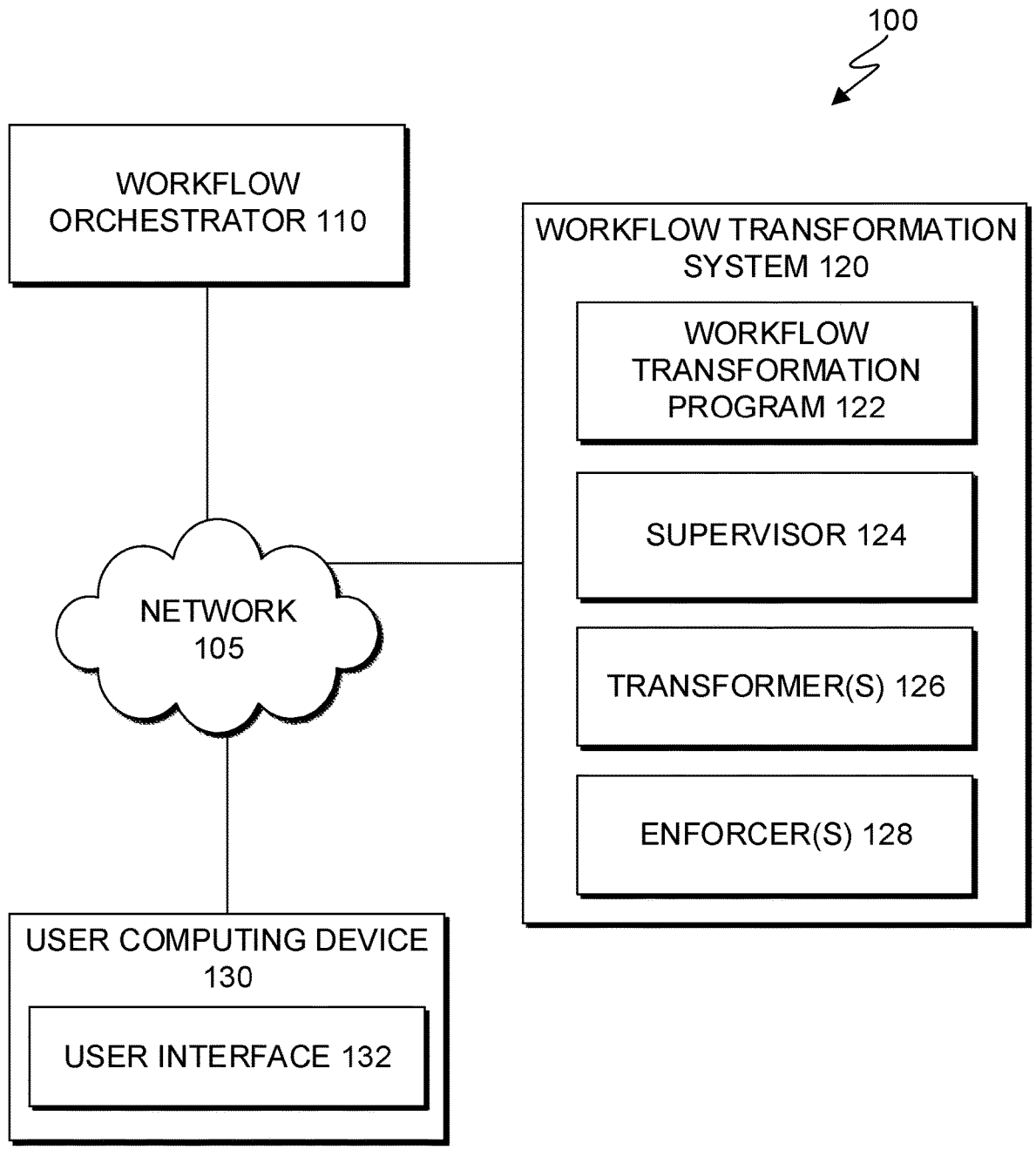
FIG. 1 is a functional block diagram illustrating a workflow transformation system within a distributed data processing environment, in accordance with an embodiment of the present invention.

FIG. 1 is a functional block diagram illustrating a distributed data processing environment, generally designated 100, in accordance with one embodiment of the present invention. The term "distributed," as used herein, describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes workflow orchestrator 110, workflow transformation system 120, and user computing device 130, interconnected over network 105. Network 105 can be, for example, a telecommunications network, a local area network (LAN), a wide area network (WAN), such as the Internet, or a combination of the three, and can include wired, wireless, or fiber optic connections. Network 105 can include one or more wired and/or wireless networks capable of receiving and transmitting data, voice, and/or video signals, including multimedia signals that include voice, data, and video information. In general, network 105 can be any combination of connections and protocols that will support communications between workflow orchestrator 110, workflow transformation system 120, user computing device 130, and other computing devices (not shown) within distributed data processing environment 100.

Workflow orchestrator 110 operates to automate a workflow by defining a logical flow of activities or tasks from a start event to an end event to accomplish a specific service. In an embodiment, workflow orchestrator 110 loads and executes workflow instances and outputs parsing and scheduling events for respective workflows. In an embodiment, workflow orchestrator 110 orchestrates the execution of one or more workflows, and, for each workflow, workflow orchestrator 110 maintains a record of the input data for the workflow and input metadata for the workflow. Input data for a workflow includes, but is not limited to, input datasets, parameters, and options. Input metadata for a workflow includes, but is not limited to, input dataset schemas and annotations, additional context information including geographical location of worker nodes, compliance frameworks applicable to dataset, and applicable security standards.

Workflow orchestrator 110 can run on a standalone computing device, a management server, a web server, a mobile computing device, or any other electronic device or computing system capable of receiving, sending, and processing data. In other embodiments, workflow orchestrator 110 can represent a server computing system utilizing multiple computers as a server system, such as in a cloud computing environment. In another embodiment, workflow orchestrator 110 can be a laptop computer, a tablet computer, a netbook computer, a personal computer (PC), a desktop computer, a personal digital assistant (PDA), a smart phone, or any programmable electronic device capable of communicating with workflow transformation system 120, user computing device 130, and other computing devices (not shown) within distributed data processing environment 100 via network 105. In another embodiment, workflow orchestrator 110 represents a computing system utilizing clustered computers and components (e.g., database server computers, application server computers, etc.) that act as a single pool of seamless resources when accessed within distributed data processing environment 100.

Workflow transformation system 120 operates to run workflow transformation program 122 which utilizes supervisor component 124, transformer(s) component 126, and enforcer(s) component 128 to suggest and apply one or more transformations of (i.e., changes to) workflows, being run on workflow orchestrator 110, that meet a set of goals while complying with a set of constraints. In an embodiment, workflow transformation system 120 can run on a standalone computing device, a management server, a web server, a mobile computing device, or any other electronic device or computing system capable of receiving, sending, and processing data. In other embodiments, workflow transformation system 120 can represent a server computing system utilizing multiple computers as a server system, such as in a cloud computing environment. In another embodiment, workflow transformation system 120 can be a laptop computer, a tablet computer, a netbook computer, a personal computer (PC), a desktop computer, a personal digital assistant (PDA), a smart phone, or any programmable electronic device capable of communicating with workflow orchestrator 110, user computing device 130, and other computing devices (not shown) within distributed data processing environment 100 via network 105. In another embodiment, workflow transformation system 120 represents a computing system utilizing clustered computers and components (e.g., database server computers, application server computers, etc.) that act as a single pool of seamless resources when accessed within distributed data processing environment 100. Workflow transformation system 120 includes workflow transformation program 122, supervisor component 124, transformer(s) component 126, and enforcer(s) component 128. Transformer(s) component 126 includes one or more transformers and enforcer(s) component 128 includes one or more enforcers. Workflow transformation system 120 may include internal and external hardware components, as depicted and described in further detail with respect to FIG. 8.

Workflow transformation program 122 operates to determine the one or more suggested transformations of a workflow, being run on workflow orchestrator 110, that meet a set of goals while complying with a set of constraints and apply (on-the-fly or pre-starting the workflow) the transformations to the workflow to create an updated workflow. In the depicted embodiment, workflow transformation program 122 is a standalone program. In another embodiment, workflow transformation program 122 may be integrated into another software product, e.g., workflow software package. Workflow transformation program 122 is depicted and described in further detail with respect to FIG. 2. In an embodiment, supervisor component 124 of workflow transformation program 122 observes events output by workflow orchestrator 110 for a workflow and triggers one or more transformers of transformer(s) component 126 and one or more enforcers of enforcer(s) component 128 when necessary. Supervisor component 124 of workflow transformation program 122 is depicted and described in further detail with respect to FIG. 3. In an embodiment, transformer(s) component 126 of workflow transformation program 122 determines one or more transformations to the workflow while meeting a set of goals and constraints. Transformer(s) component 126 of workflow transformation program 122 is depicted and described in further detail with respect to FIG. 4. In an embodiment, enforcer(s) component 128 of workflow transformation program 122 computes and applies a workflow update based on the transformations suggested. Enforcer(s) component 128 of workflow transformation program 122 is depicted and described in further detail with respect to FIG. 5.

User computing device 130 operates as a computing device associated with a user on which the user can interact with workflow transformation program 122 through an application user interface. In the depicted embodiment, user computing device 130 includes an instance of user interface 132. In an embodiment, user computing device 130 can be a laptop computer, a tablet computer, a smart phone, a smart watch, an e-reader, smart glasses, wearable computer, or any programmable electronic device capable of communicating with various components and devices within distributed data processing environment 100, via network 105. In general, user computing device 130 represents one or more programmable electronic devices or combination of programmable electronic devices capable of executing machine readable program instructions and communicating with other computing devices (not shown) within distributed data processing environment 100 via a network, such as network 105.

User interface 132 provides an interface between workflow transformation program 122 and a user of user computing device 130. In one embodiment, user interface 132 is a mobile application software. Mobile application software, or an "app," is a computer program designed to run on smart phones, tablet computers, and other mobile computing devices. In one embodiment, user interface 132 may be a graphical user interface (GUI) or a web user interface (WUI) that can display text, documents, web browser windows, user options, application interfaces, and instructions for operation, and include the information (such as graphic, text, and sound) that a program presents to a user and the control sequences the user employs to control the program. User interface 132 enables a user of user computing device 130 to view and/or manage output of workflow transformation program 122.

The workflow transformation program 122 may interact with user interface 132, supervisor component 124, transformer(s) component 126, and enforcer(s) component 128. For example, the user interface 132 may configure workflow transformation system 120 by propagating user provided configurations and settings to workflow transformation program 122. Workflow transformation program 122 may configure supervisor component 124, transformer(s) component 126, and enforcer(s) component 128. Workflow transformation program 122 may also collect metadata, e.g., provenance information, about the behavior of supervisor component 124, transformer(s) component 126, and enforcer(s) component 128. The provenance information may comprise a record of a process and the entities that have either produced new data, transformed existing data, or both.

Figure 2:
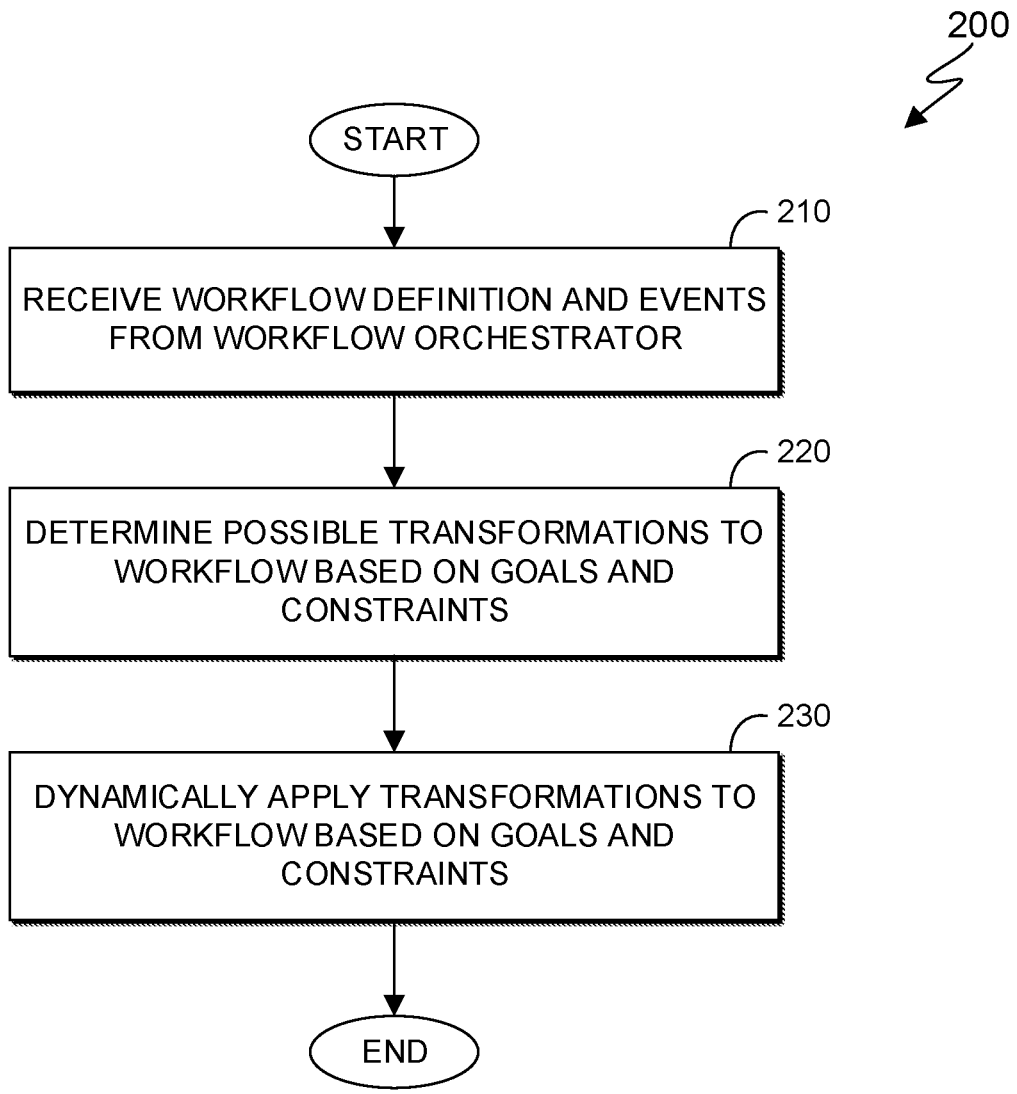
FIG. 2 is a flowchart depicting operational steps of a workflow transformation program, for the transformation of workflows to meet a set of goals while complying with a set of constraints, running on the workflow transformation system of the distributed data processing environment of FIG. 1 in accordance with an embodiment of the present invention.

FIG. 2 is a flowchart 200 depicting operational steps of workflow transformation program 122, for determining one or more suggested transformations of a workflow that meet a set of goals while complying with a set of constraints and apply (on-the-fly or pre-starting the workflow) the transformations to the workflow to create an updated workflow, running on workflow transformation system 120 of distributed data processing environment 100 of FIG. 1 in accordance with an embodiment of the present invention. It should be appreciated that the process depicted in FIG. 2 illustrates one possible iteration of workflow transformation program 112, which may be repeated for each workflow or event received from workflow orchestrator 110. By handling parsing events output by workflow orchestrator 110, workflow transformation program 122 is triggered before/after loading a workflow or part of a workflow definition, or when the workflow definition changes. By handling scheduling events output by workflow orchestrator 110, workflow transformation program 122 is triggered any time the state of a workflow node changes (e.g., node becomes ready or finishes executing). Workflow transformation program 122 is triggered by scheduler component 124 deciding to react to an event output by workflow orchestrator 110.

In step 210, workflow transformation program 112 receives a workflow definition and events for a workflow output from a workflow orchestrator. In an embodiment, workflow transformation program 112 receives, at supervisor component 124, parsing and scheduling events emitted by workflow orchestrator 110. A parsing event can be a workflow loaded or a part of a workflow loaded, whereas a scheduling event can be a workflow node transition to a state, for example, the ready-to-execute state or the completed-successfully state. Step 210 as run by supervisor component 124 is depicted and described in further detail with respect to FIG. 3.

In step 220, workflow transformation program 112 utilizes one or more transformers to determine possible transformations to the workflow based on a set of goals and a set of constraints. In an embodiment, workflow transformation program 112 utilizes one or more transformers of transformer(s) component 126 to determine possible transformations, such as, addition of new nodes and/or graphs, modification of existing nodes and/or graphs, and removal of existing nodes and/or graphs. Examples of a transformation include, but are not limited to, addition of processing nodes, replacement of subgraphs of the workflow with other subgraphs, replacement of workflow subgraphs with cached computed data, and addition of logging events for audit (e.g., provenance information). Possible transformations can affect the workflow structure and depend on characteristics defined at configuration/implementation time of the transformers themselves. Step 220 as run by transformer(s) component 126 is depicted and described in further detail with respect to FIG. 4.

In step 230, workflow transformation program 112 dynamically applies one or more transformations to the workflow based on the set of goals and the set of constraints. In an embodiment, workflow transformation program 112 uses one or more enforcers of enforcer(s) component 128 to dynamically update the workflow (even if workflow is already executing) based on the suggested transformations and the set of goals and constraints. Step 230 as run by enforcer(s) component 128 is depicted and described in further detail with respect to FIG. 5.

Figure 3:
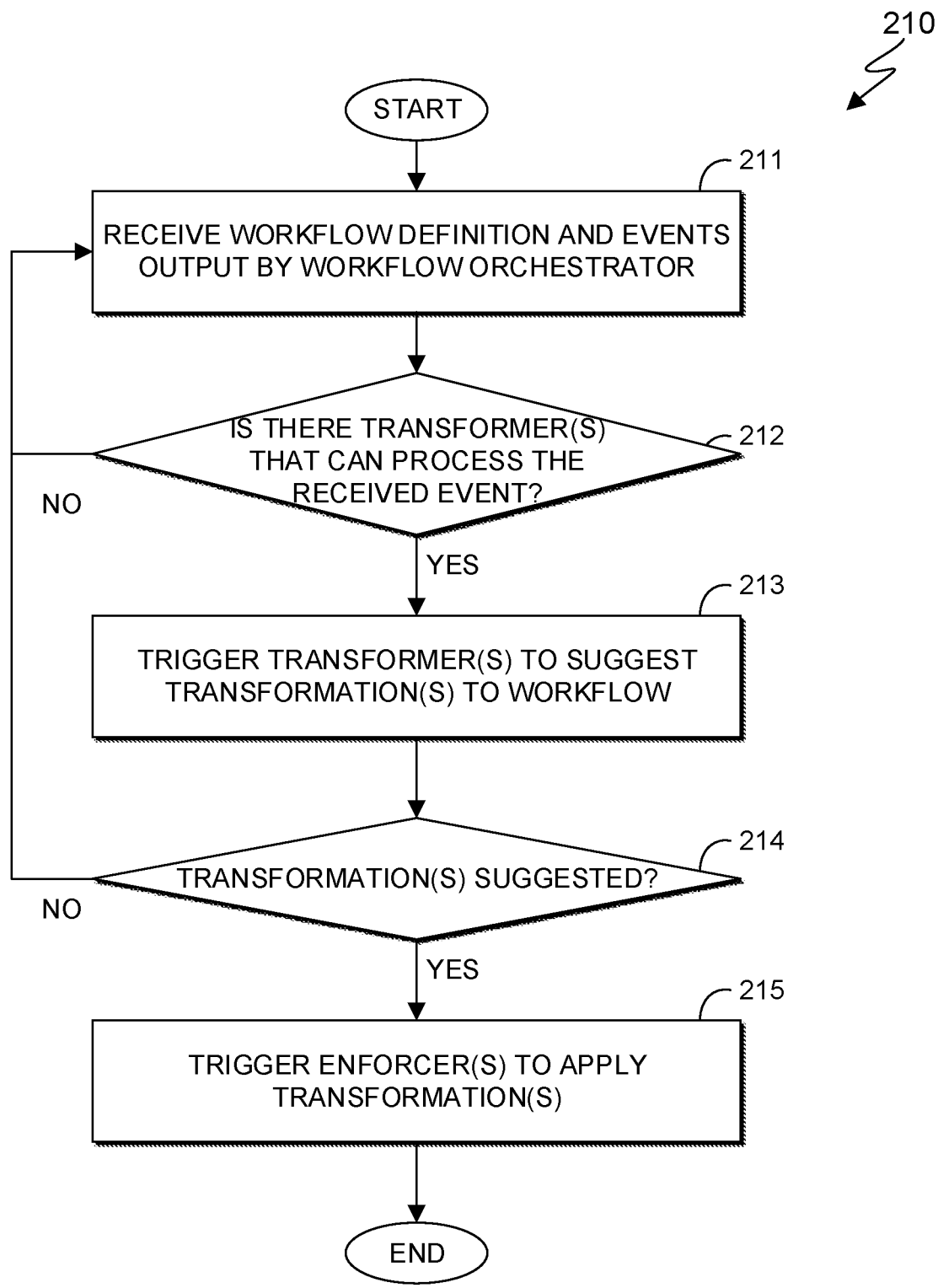
FIG. 3 is a flowchart depicting operational steps of a supervisor component of the workflow transformation system of the distributed data processing environment of FIG. 1 in accordance with an embodiment of the present invention.

FIG. 3 is a flowchart depicting operational steps of step 210 from FIG. 2 completed by supervisor component 124 of workflow transformation system 120 of distributed data processing environment 100 of FIG. 1 in accordance with an embodiment of the present invention. It should be appreciated that the process depicted in FIG. 3 illustrates one possible iteration of step 210, which may be repeated for each parsing or scheduling event received from workflow orchestrator 110 for one or more workflows.

In step 211, supervisor component 124 receives a workflow definition and events for one or more workflows by a workflow orchestrator. In an embodiment, supervisor component 124 receives, from workflow orchestrator 110, a workflow definition for the workflow and parsing and scheduling events for a workflow. In some embodiments, supervisor component 124 receives batches of events for a workflow output by workflow orchestrator 110. Supervisor component 124 listens for events that workflow orchestrator 110 emits. These events carry some information about an "interesting happening" (e.g., loaded a workflow, the definition of the workflow changed, the state of a workflow node changed, etc.) as well as the definition of the workflow.

In decision 212, for a received event, supervisor component 124 determines whether at least one transformer can process this event. In an embodiment, supervisor component 124 checks whether there is a transformer that can process this event. If there is at least one such transformer, supervisor component 124 triggers the one or more transformers to handle the event. Otherwise, supervisor component 124 just waits for the next event to arrive.

If supervisor component 124 determines that at least one transformer of transformer(s) component 126 can process this event (decision 212, YES branch), supervisor component 124 proceeds to step 213. If supervisor component 124 determines that there is not at least one transformer of transformer(s) component 126 that can process this event (decision 212, NO branch), supervisor component 124 waits for another event to be received by supervisor component 124.

In step 213, supervisor component 124 triggers transformer(s) component 126 to suggest transformation(s) to the workflow. In an embodiment, supervisor component 124 triggers associated transformer(s) of transformer(s) component 126 to process the event and potentially generate transformations. The operational steps of transformer(s) component 126 are detailed in FIG. 4.

In decision 214, supervisor component 124 determines whether transformer(s) component 126 suggested transformation(s). If supervisor component 124 determines that transformer(s) component 126 suggested transformation(s) (decision 214, YES branch), supervisor component 124 proceeds to step 215. If supervisor component 124 determines that transformer(s) component 126 did not suggest transformation(s) (decision 214, NO branch), supervisor component 124 waits for another event to be received by supervisor component 124.

In step 215, supervisor component 124 triggers enforcer(s) component 128 to apply the transformation(s) suggested by transformer(s) component 126. Each enforcer could be specialized for a particular set of constraints and/or goals, i.e., is set up to apply a subset of the one or more transformations based on at least one of a subset of the set of goals and a subset of the constraints. One enforcer could take a set of transformations and optimize a workflow with respect to its execution time. Another enforcer could take a set of transformations and optimize a workflow with respect to how much money it costs to execute the workflow. One embodiment could be using both of these enforcers to first modify a workflow with respect to its execution time, and then a second time to minimize the cost of running the now performance-optimized workflow. The operational steps of enforcer(s) component 128 are detailed in FIG. 5.

Figure 4:
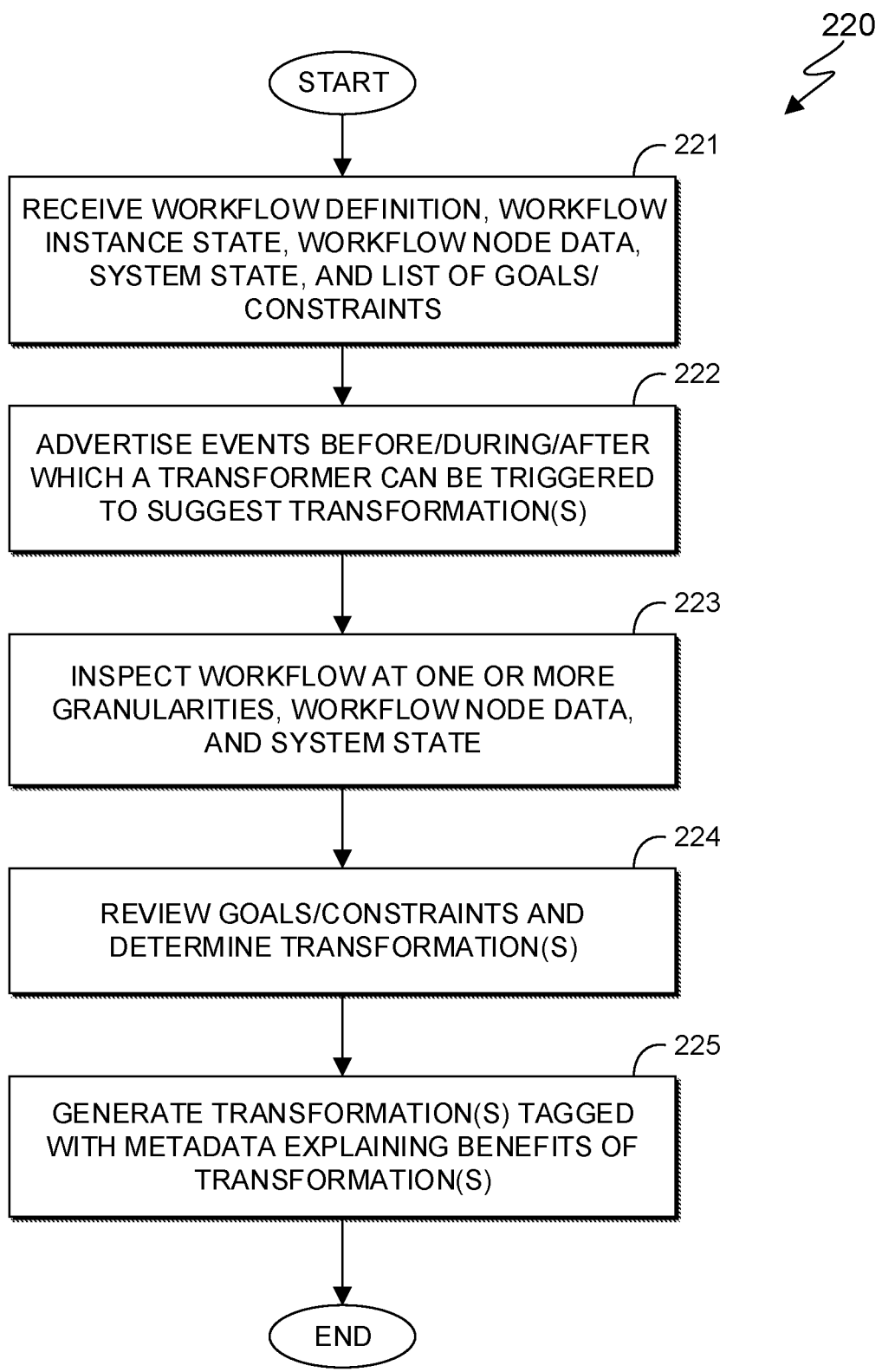
FIG. 4 is a flowchart depicting operational steps of a transformer(s) component of the workflow transformation system of the distributed data processing environment of FIG. 1 in accordance with an embodiment of the present invention.

FIG. 4 is a flowchart depicting operational steps of step 220 from FIG. 2 completed by respective one or more transformers of transformer(s) component 126 of workflow transformation system 120 of distributed data processing environment 100 of FIG. 1 in accordance with an embodiment of the present invention. It should be appreciated that the process depicted in FIG. 4 illustrates one possible iteration of step 220, which may be repeated each time transformer(s) component 126 is triggered by supervisor component 124.

In step 221, transformer(s) component 126 receives the workflow definition, workflow instance state, workflow node data, system state, and list of goals and constraints for a workflow. In an embodiment, the one or more transformers transformer(s) component 126 triggered by supervisor component 124 receives the workflow definition, workflow instance state, workflow node data produced thus far (e.g., access to storage locations that the workflow nodes use), system state, and list of goals and constraints for a workflow and its associated workflow instance. An example goal is to minimize the execution time of the workflow instance. Another example goal is to minimize the cost of executing the workflow instance. An example constraint is for the outputs of the workflow nodes to never include sensitive information (e.g., any data that identifies a certain person). Another example constraint is that the schema of the outputs that the workflow instance generates must not change as a side-effect of the transformations.

The workflow definition, or simply the workflow, is a blueprint that describes which tasks to execute and the dependencies between the tasks. This is offline information, i.e., information that is encoded directly in the workflow definition. The workflow instance is a superset of a workflow. The workflow instance also contains online information, i.e., information that is created when executing the workflow. By initiating the execution of a workflow, the workflow transforms into a workflow instance. The state of the workflow instance comprises the workflow definition and any metadata about the execution of the workflow. This metadata includes input data, input metadata, output, output metadata, and state of workflow nodes.

Each time the workflow orchestrator takes an action (e.g., schedules a task) the "state" of the workflow instance changes. The workflow instance state also changes each time the workflow definition is updated as well as each time a workflow node state changes. One way for a workflow node state to change is for the state of the task that is associated with this node to change. For example, when the task associated with a workflow node terminates, the state of the workflow node also changes to reflect that its task has just finished executing.

System state includes information about the compute system that is used to execute the workflow instance. Though a workflow instance state also includes the workflow definition, some transformers could be applied to workflows before they are even executed.

In step 222, transformer(s) component 126 advertises a list of events for which a transformer can process and therefore be triggered before, during, and after the event to process the information recorded in the event and suggest zero or more transformations. A transformer "advertises" that the transformer can process certain events (e.g., one or more kinds of events). The transformer contains logic to handle these events and suggest transformations. Each of the transformers in transformer(s) component 126 may optionally advertise what kind of events it can process 222. This is so that supervisor component 124 only triggers a particular transformer of transformer(s) component 126 for an event that the transformer has advertised it can process. If a transformer does not advertise that it can process specific event types, then supervisor component 124 triggers that particular transformer for all events.

In step 223, transformer(s) component 126 inspects the workflow at one or more granularities, the workflow node data produced thus far, and the system state, i.e., state of the compute resources, e.g., available capacity of compute resources, health of compute resources, current cost of compute resources, energy consumption, etc.

In step 224, transformer(s) component 126 reviews the list of goals and constraints and determines transformation(s) to suggest. The goal of a transformer is to look at the goals and constraints, information encoded in an event, and information about the system and then suggest (i.e., generate) transformations. The transformations that the transformer determines are such that when the transformations are applied to the workflow instance they make the future workflow instance state, and/or future system state, satisfy the current goals/constraints.

In step 225, transformer(s) component 126 generates the transformation(s) and tags the transformation(s) with metadata explaining benefits and/or risks of each transformation. In an embodiment, transformer(s) component 126 generates the suggested transformation(s) and may also tag the transformation(s) with metadata explaining benefits and/or risks of each transformation (e.g., better resource utilization, privacy enhancing action for a data reference, etc.). A transformer of transformer(s) component 126 generates the transformations by packaging them and exporting them in a format that an enforcer from the enforcer(s) component 128 can consume. The package may also contain metadata about the expected benefits and risks of the transformations.

In an example embodiment of the process done by at least one transformer of transformer(s) component 126, a transformer could advertise that it can handle events which indicate that a workflow node transitioned to the ready-to-execute state. The transformer would then inspect the available compute capacity on the cluster, the resource request of the workflow node, and the goals/constraints, e.g., optimize the completion time of the workflow instance to determine zero or more transformations. If the workflow node requests more CPU capacity than what is currently available in the cluster, the transformer could generate a transformation to modify the definition of a workflow node that transitioned to the ready-to-execute state so that its CPU resource request is equal to the available CPU capacity of the cluster. This transformation aims to reduce the chances that the task of the workflow node which just transitioned to the ready-to-execute state enters a queue for acquiring CPU resources. The less time the tasks of the workflow spend queuing, the faster they complete, and the faster the workflow tasks complete, the faster the entire workflow instance completes.

Figure 5:
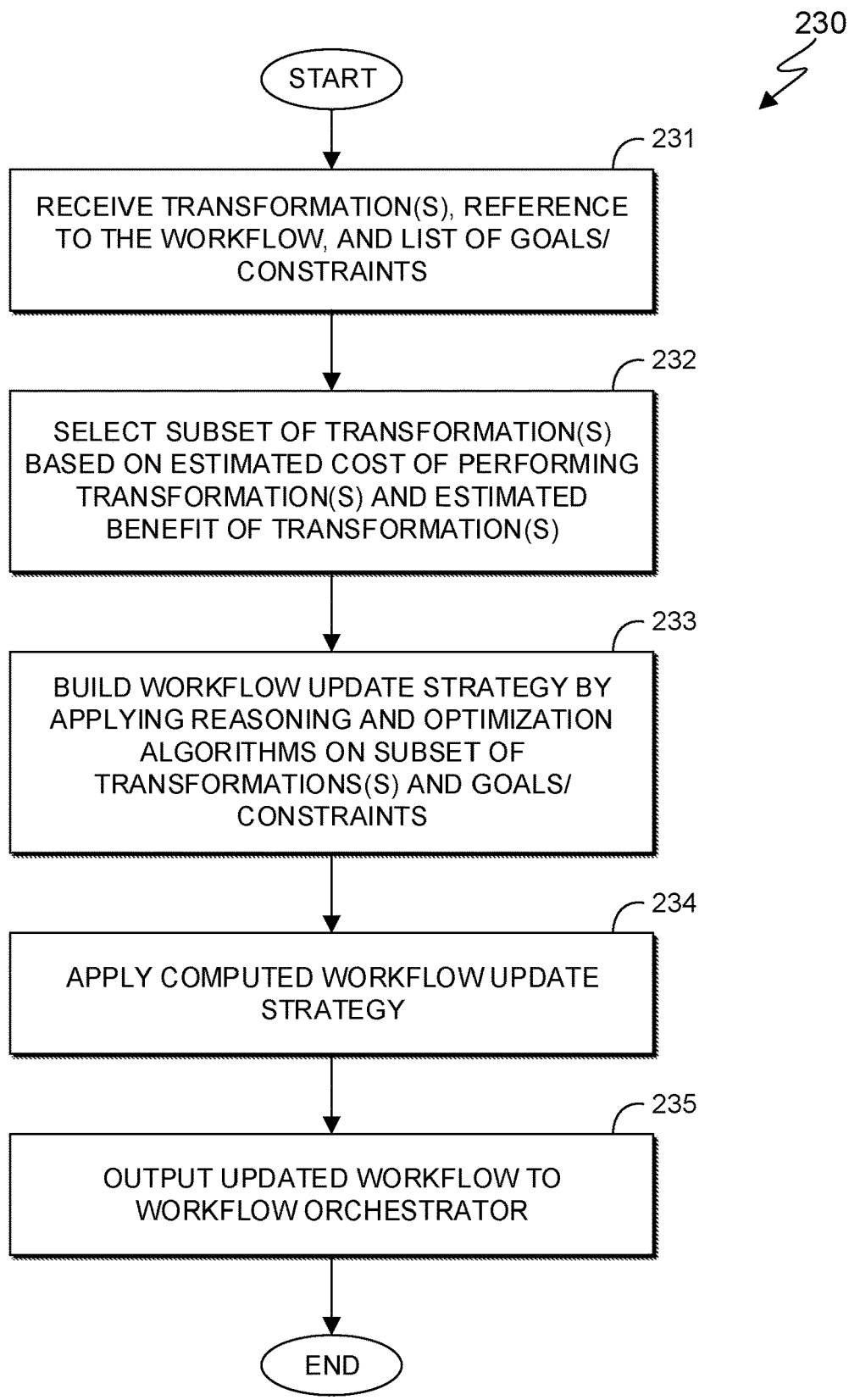
FIG. 5 is a flowchart depicting operational steps of a enforcer(s) component of the workflow transformation system of the distributed data processing environment of FIG. 1 in accordance with an embodiment of the present invention.

FIG. 5 is a flowchart depicting operational steps of step 230 from FIG. 2 completed by one or more enforcers of enforcer(s) component 128 of workflow transformation system 120 of distributed data processing environment 100 of FIG. 1 in accordance with an embodiment of the present invention. It should be appreciated that the process depicted in FIG. 5 illustrates one possible iteration of step 230, which may be repeated each time one or more enforcers of enforcer(s) component 128 is triggered by supervisor component 124.

In step 231, enforcer(s) component 128 receives the transformation(s), the workflow definition, and the list of goals and constraints. In an embodiment, the one or more enforcers of enforcer(s) component 128 triggered by supervisor component 124 receive the transformation(s), the workflow definition, and the list of goals and constraints.

In step 232, an enforcer in the enforcer(s) component 128 selects a subset of the transformation(s) based on an estimated cost of performing the transformation(s) and an estimated benefit of the transformation(s). In an embodiment, the one or more enforcers of enforcer(s) component 128 selects a subset of the transformation(s) after merging conflicting/overlapping/redundant transformations based on the goals and constraints.

In step 233, the one or more enforcers of enforcer(s) component 128 build a workflow update strategy comprising updating workflow nodes, removing workflow nodes, adding workflow nodes, and modifying the workflow instance state by applying one or more reasoning and/or optimization algorithms on the subset of transformation(s) subject to the list of goals and constraints. An enforcer can be specialized for a task, i.e., an enforcer comes with one or more reasoning and optimization algorithms. A reasoning algorithm produces conclusions out of the available knowledge. An optimization algorithm finds a satisfactory solution to a problem.

In step 234, the one or more enforcers of enforcer(s) component 128 apply the workflow update strategy to the workflow to produce an updated workflow. In some embodiments, the one or more enforcers of enforcer(s) component 128 dynamically update, add, and remove workflow nodes from a workflow definition even if the workflow definition is under execution (i.e., it is part of a workflow instance).

The workflow update strategy is the order of update/remove/add operations to the workflow nodes as well as the triggering of certain workflow orchestrator actions to facilitate the dynamic manipulation of the associated workflow instance, which is under-execution.

In other embodiments, the one or more enforcers of enforcer(s) component 128 skip the execution of workflow nodes that have been executed in the past and their results are stored in some data cache. Instead of executing those workflow nodes, the workflow definition is updated to reuse the cached outputs, thereby improving the time-to-completion. The workflow update strategy then involves identifying which of the workflow nodes can be memoized (i.e., can reuse their cached outputs), retrieving the cached outputs for these nodes, informing the workflow orchestrator that these workflow nodes should not be executed, and populating the outputs of these memoized workflow nodes with the cached output data.

In step 235, an enforcer in the enforcer(s) component 128 outputs the updated workflow to the workflow orchestrator. After step 235, the workflow orchestrator 110 updates its internal data structures and uses the updated workflow produced in step 234.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
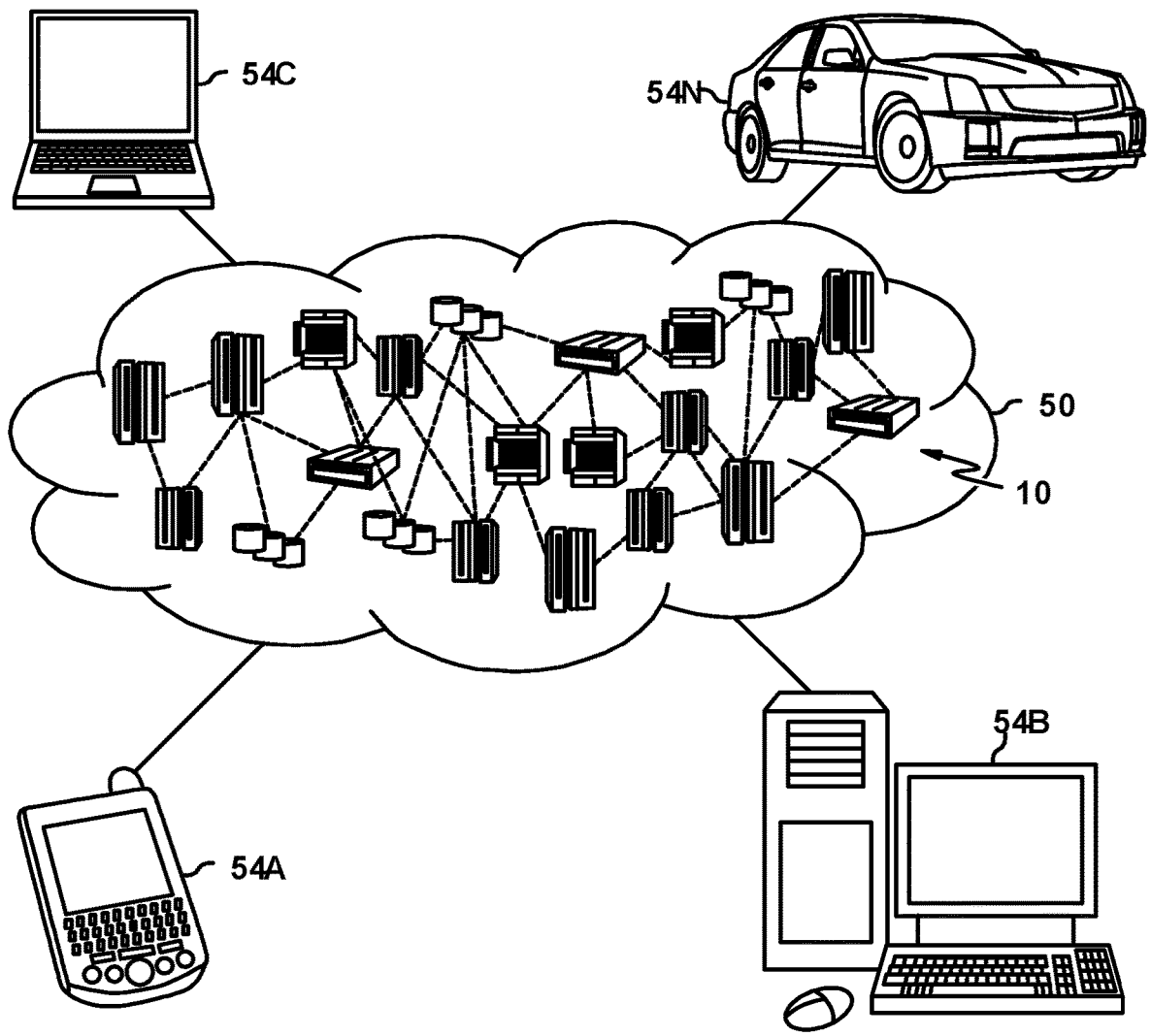
FIG. 6 depicts a cloud computing environment, in accordance with an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 6 are intended to be illustrative only and that computing nodes 10 and cloud computing environment 50 can communicate with any type of computerized device over any type of network and/or network addressable connection (e.g., using a web browser).

Figure 7:
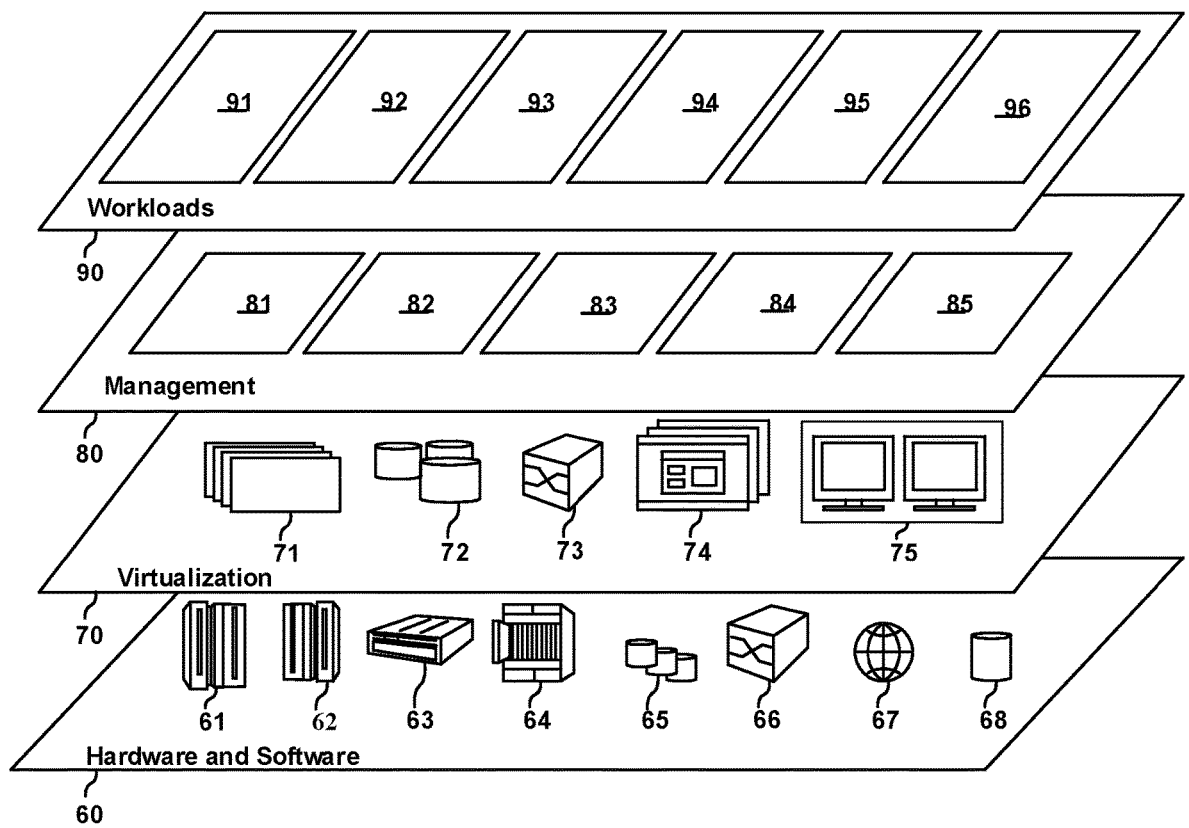
FIG. 7 depicts abstraction model layers, in accordance with an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and workflow transformation processing 96.

Figure 8:
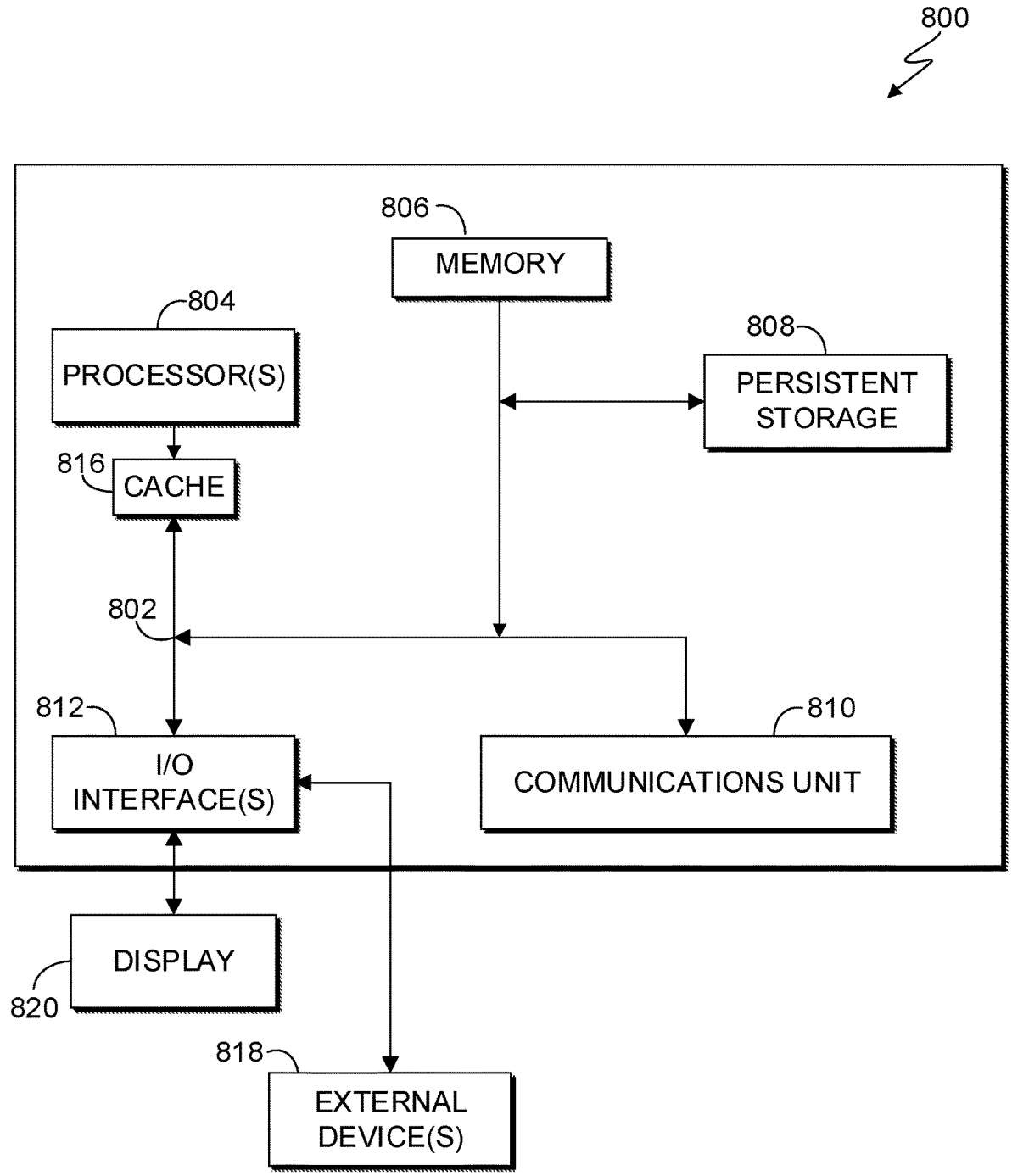
FIG. 8 depicts a block diagram of components of a computing device for the workflow transformation program of the workflow transformation system of the distributed data processing environment of FIG. 1, for running the workflow transformation program, in accordance with an embodiment of the present invention.

FIG. 8 depicts a block diagram of components of computing device 800, suitable for workflow transformation program 122 on workflow transformation system 120 within distributed data processing environment 100 of FIG. 1, in accordance with an embodiment of the present invention. It should be appreciated that FIG. 8 provides only an illustration of one implementation and does not imply any limitations with regard to the environments in which different embodiments can be implemented. Many modifications to the depicted environment can be made.

Computing device 800 includes communications fabric 802, which provides communications between cache 816, memory 806, persistent storage 808, communications unit 810, and input/output (I/O) interface(s) 812. Communications fabric 802 can be implemented with any architecture designed for passing data and/or control information between processors (such as microprocessors, communications and network processors, etc.), system memory, peripheral devices, and any other hardware components within a system. For example, communications fabric 802 can be implemented with one or more buses or a crossbar switch.

Memory 806 and persistent storage 808 are computer readable storage media. In this embodiment, memory 806 includes random access memory (RAM). In general, memory 806 can include any suitable volatile or non-volatile computer readable storage media. Cache 816 is a fast memory that enhances the performance of computer processor(s) 804 by holding recently accessed data, and data near accessed data, from memory 806.

Programs may be stored in persistent storage 808 and in memory 806 for execution and/or access by one or more of the respective computer processors 804 via cache 816. In an embodiment, persistent storage 808 includes a magnetic hard disk drive. Alternatively, or in addition to a magnetic hard disk drive, persistent storage 808 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 808 may also be removable. For example, a removable hard drive may be used for persistent storage 808. Other examples include optical and magnetic disks, thumb drives, and smart cards that are inserted into a drive for transfer onto another computer readable storage medium that is also part of persistent storage 808.

Communications unit 810, in these examples, provides for communications with other data processing systems or devices. In these examples, communications unit 810 includes one or more network interface cards. Communications unit 810 may provide communications through the use of either or both physical and wireless communications links. Programs may be downloaded to persistent storage 808 through communications unit 810.

I/O interface(s) 812 allows for input and output of data with other devices that may be connected to workflow transformation system 120. For example, I/O interface 812 may provide a connection to external devices 418 such as a keyboard, keypad, a touch screen, and/or some other suitable input device. External devices 818 can also include portable computer readable storage media such as, for example, thumb drives, portable optical or magnetic disks, and memory cards. Software and data used to practice embodiments of the present invention can be stored on such portable computer readable storage media and can be loaded onto persistent storage 808 via I/O interface(s) 812. I/O interface(s) 812 also connect to a display 820.

Display 820 provides a mechanism to display data to a user and may be, for example, a computer monitor.

Programs described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
receiving, by one or more processors of a system, one or more events for an in-process workflow output by a workflow orchestrator, wherein the one or more events are at least one of a parsing event and a scheduling event, and wherein the system works alongside the workflow orchestrator to adapt workflows to meet respective pre-defined sets of goals and constraints;
identifying and triggering, by the one or more processors, one or more transformers of the system for processing the one or more events, wherein each transformer contains logic to process certain types of events, wherein the one or more transformers are constrained from a schema associated with the workflow output;
determining, by the one or more processors, using the one or more transformers, one or more transformations to the in-process workflow based on the one or more processed events and a pre-defined set of goals and constraints for the in-process workflow, wherein the one or more transformations are one or more modifications to the in-process workflow, and wherein the one or more transformations include replacing one or more workflow subgraphs with cached workflow outputs;
selecting, by the one or more processors, a subset of the one or more transformations based on the estimated cost and benefit of performing a respective transformation and after merging conflicting or overlapping transformations of the one or more transformations;
building, by the one or more processors, a workflow update strategy for the in-process workflow that includes an order of operations for the subset of the one or more transformations to the in-process workflow and triggers for actions of the workflow orchestrator to facilitate dynamic modification of the in-process workflow; and
dynamically applying, by the one or more processors, the workflow update strategy to the in-process workflow producing an updated workflow by triggering actions of the workflow orchestrator.

2. The computer-implemented method of claim 1, wherein each transformer of the one or more transformers advertises one or more types of events that each respective transformer is set up with logic to process.

3. The computer-implemented method of claim 1, further comprising:
triggering, by the one or more processors, at least one transformer of the one or more transformers based on the one or more events received to process the one or more events and determine if there is a transformation to propose; and
triggering, by the one or more processors, at least one enforcer of the one or more enforcers based on the one or more transformations and the set of goals and the set of constraints.

4. The computer-implemented method of claim 1, wherein each enforcer of the one or more enforcers is set up to apply respective transformations based on at least one of a goal of the set of goals and a constraint of the set of constraints.

5. The computer-implemented method of claim 1, further comprising:

receiving, by a respective transformer, the workflow definition, a workflow instance state, workflow node data, a system state, the set of goals, and the set of constraints;
analyzing, by the respective transformer, the workflow at one or more granularities, the workflow node data, and the system state.

6. The computer-implemented method of claim 1, further comprising:
generating, by the one or more processors, the one or more transformations by packaging the one or more transformations and exporting the one or more transformations in a format that the one or more enforcers can read;
tagging, by the one or more processors, the one or more transformations with metadata comprising benefits and risks for each transformation.

7. The computer-implemented method of claim 1, wherein building, using the one or more enforcers, the workflow update strategy further comprises:
building, by the one or more processors, the workflow update strategy by applying at least one of a reasoning algorithm and an optimization algorithm to the subset of the one or more transformations subject to the set of goals and the set of constraints.

8. A computer program product comprising:
one or more computer readable storage media and program instructions collectively stored on the one or more computer readable storage media, the stored program instructions comprising:
program instructions to receive, by a system, one or more events for an in-process workflow output by a workflow orchestrator, wherein the one or more events are at least one of a parsing event and a scheduling, and wherein the system works alongside the workflow orchestrator to adapt workflows to meet respective pre-defined sets of goals and constraints;
program instructions to identify and trigger one or more transformers of the system for processing the one or more events, wherein each transformer contains logic to process certain types of events, wherein the one or more transformers are constrained with respect to changing a schema associated with the workflow output;
program instructions to determine, using the one or more transformers, one or more transformations to the in-process workflow based on the one or more processed events and a pre-defined set of goals and constraints for the in-process workflow, wherein the one or more transformations are one or more modifications to the in-process workflow, and wherein the one or more transformations include replacing one or more workflow subgraphs with cached workflow outputs;
program instructions to select, a subset of the one or more transformations based on the estimated cost and benefit of performing a respective transformation and after merging conflicting or overlapping transformations of the one or more transformations;
program instructions to build, a workflow update strategy for the in-process workflow that includes an order of operations for the subset of the one or more transformations to the in-process workflow and triggers for actions of the workflow orchestrator to facilitate dynamic modification of the in-process workflow; and program instructions to dynamically apply, the workflow update strategy to the in-process workflow producing an updated workflow by triggering actions of the workflow orchestrator.

9. The computer program product of claim 8, wherein each transformer of the one or more transformers advertises one or more types of events that each respective transformer is set up with logic to process.

10. The computer program product of claim 8, further comprising:
program instructions to trigger at least one transformer of the one or more transformers based on the one or more events received to process the one or more events and determine if there is a transformation to propose; and
program instructions to trigger at least one enforcer of the one or more enforcers based on the one or more transformations and the set of goals and the set of constraints.

11. The computer program product of claim 8, wherein each enforcer of the one or more enforcers is set up to apply respective transformations based on at least one of a goal of the set of goals and a constraint of the set of constraints.

12. The computer program product of claim 8, further comprising:
program instructions to receive, by a respective transformer, the workflow definition, a workflow instance state, workflow node data, a system state, the set of goals, and the set of constraints;
program instructions to analyze, by the respective transformer, the workflow at one or more granularities, the workflow node data, and the system state.

13. The computer program product of claim 8, further comprising:
program instructions to generate the one or more transformations by packaging the one or more transformations and exporting the one or more transformations in a format that the one or more enforcers can read;
program instructions to tag the one or more transformations with metadata comprising benefits and risks for each transformation.

14. The computer program product of claim 8, wherein the program instructions to build, using the one or more enforcers, the workflow update strategy further comprise:
program instructions to build the workflow update strategy by applying at least one of a reasoning algorithm and an optimization algorithm to the subset of the one or more transformations subject to the set of goals and the set of constraints.

15. A computer system comprising:
one or more computer processors;
one or more computer readable storage media;
program instructions collectively stored on the one or more computer readable storage media for execution by at least one of the one or more computer processors for working alongside a workflow orchestrator to adapt workflows to meet respective pre-defined sets of goals and constraints, the stored program instructions comprising:
program instructions to receive one or more events for an in-process workflow output by the workflow orchestrator, wherein the one or more events are at least one of a parsing event and a scheduling event;
program instructions to identify and trigger one or more transformers of the system for processing the one or more events, wherein each transformer contains logic to process certain types of events, wherein the one or more transformers are constrained from changing a schema associated with the workflow output;
program instructions to determine, using the one or more transformers, one or more transformations to the in-process workflow based on the one or more processed events and a pre-defined set of goals and constraints for the in-process workflow, wherein the one or more transformations are one or more modifications to the in-process workflow, and wherein the one or more transformations are each tagged with metadata including an estimated cost and benefit of performing a respective transformation include replacing one or more workflow subgraphs with cached workflow outputs;
program instructions to select, a subset of the one or more transformations based on the estimated cost and benefit of performing a respective transformation and after merging conflicting or overlapping transformations of the one or more transformations;
program instructions to build, a workflow update strategy for the in-process workflow that includes an order of operations for the subset of the one or more transformations to the in-process workflow and triggers for actions of the workflow orchestrator to facilitate dynamic modification of the in-process workflow; and
program instructions to dynamically apply, the workflow update strategy to the in-process workflow producing an updated workflow by triggering actions of the workflow orchestrator.

16. The computer system of claim 15, wherein each transformer of the one or more transformers advertises one or more types of events that each respective transformer is set up with logic to process.

17. The computer system of claim 15, further comprising:
program instructions to trigger at least one transformer of the one or more transformers based on the one or more events received to process the one or more events and determine if there is a transformation to propose; and
program instructions to trigger at least one enforcer of the one or more enforcers based on the one or more transformations and the set of goals and the set of constraints.

18. The computer system of claim 15, wherein each enforcer of the one or more enforcers is set up to apply respective transformations based on at least one of a goal of the set of goals and a constraint of the set of constraints.

19. The computer system of claim 15, further comprising:
program instructions to receive, by a respective transformer, the workflow definition, a workflow instance state, workflow node data, a system state, the set of goals, and the set of constraints;
program instructions to analyze, by the respective transformer, the workflow at one or more granularities, the workflow node data, and the system state.

20. The computer program product of claim 8, wherein the program instructions to build, using the one or more enforcers, the workflow update strategy further comprise:
program instructions to build the workflow update strategy by applying at least one of a reasoning algorithm and an optimization algorithm to the subset of the one or more transformations subject to the set of goals and the set of constraints.

* * * * *